A. B. MILLER.
MOTOR BOAT DRIVING GEAR.
APPLICATION FILED MAR. 29, 1916.
1,195,146.  Patented Aug. 15, 1916.
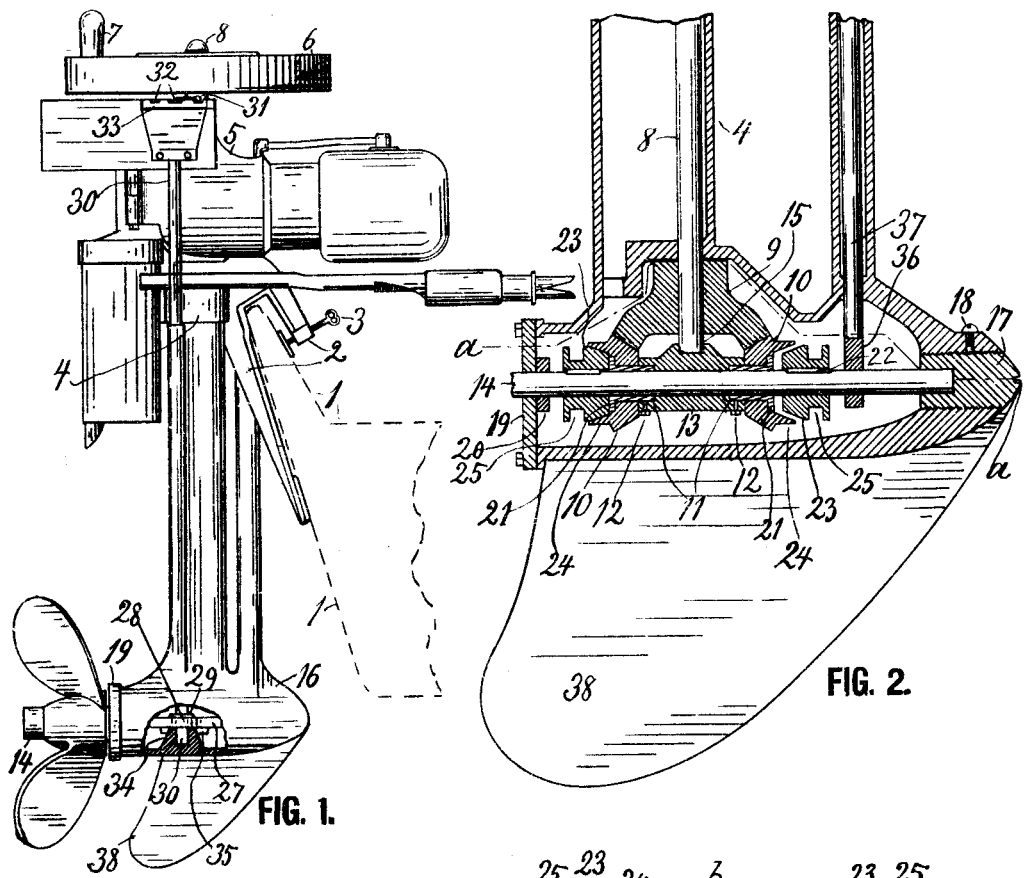
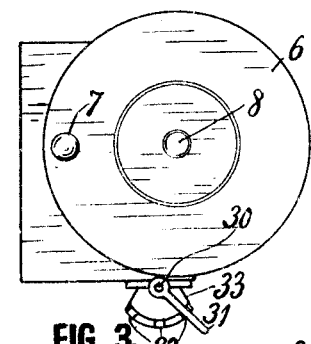
FIG. 3.
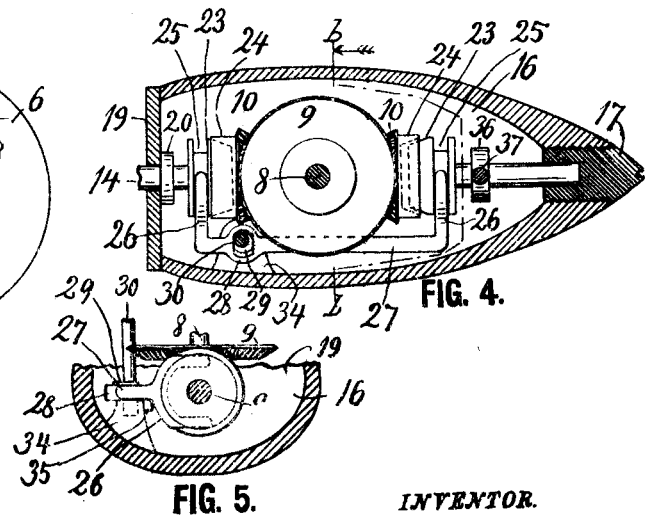
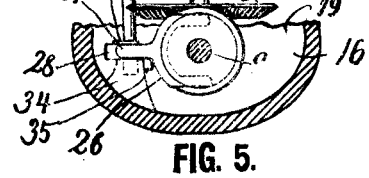
FIG. 5.
INVENTOR.
A. B. Miller
BY his ATTORNEY: A. M. Carlsen

UNITED STATES PATENT OFFICE.

ANDREW B. MILLER, OF BALDWIN, WISCONSIN, ASSIGNOR OF ONE-FOURTH TO RASMUS JOHNSON, ONE-FOURTH TO HORACE C. NELSON, AND ONE-FOURTH TO EDWARD CHRISTENSEN, ALL OF BALDWIN, WISCONSIN.

MOTOR-BOAT DRIVING-GEAR.

1,195,146.  Specification of Letters Patent.  Patented Aug. 15, 1916.

Application filed March 29, 1916. Serial No. 87,615.

*To all whom it may concern:*

Be it known that I, ANDREW B. MILLER, a citizen of the United States, residing at Baldwin, in the county of St. Croix and State of Wisconsin, have invented a new and useful Motor-Boat Driving-Gear, of which the following is a specification.

My invention relates to driving gears or clutch mechanisms for motor boats; and the object is to provide a noiseless clutch mechanism by which the propeller of a motor boat or the driven axle of a motor may be started, stopped and reversed without stopping or reversing the engine, and without the noisy and risky operation of throwing gears out of and into mesh while they are running.

In the accompanying drawing, Figure 1 is a partly sectional side elevation of a motor boat engine and propelling and steering mechanism detachably secured upon the rear end of the boat, the latter indicated in dotted outline only. Fig. 2 is an enlarged longitudinal vertical section of the lower portion of Fig. 1. Fig. 3 is a top view of the main portion of Fig. 1. Fig. 4 is a horizontal section of the device about as on the line *a—a* Fig. 2. Fig. 5 is a section on the line *b—b* Fig. 4.

Referring to the drawing by reference numerals, 1 designates the rear portion of a boat on which, by a clamp 2 having a clamping screw 3, the frame 4 of an engine 5 is secured. As a rule such engines are single acting or rotatable only in one direction, and provided with a fly wheel 6 having a handle 7 by which to "crank" the engine. On the engine shaft 8 is fixed a bevel gear 9 which constantly meshes with two bevel gears 10, which are mounted to rotate on bushings 11, held by set screws 12 in opposite ends of a sleeve 13, journaled upon the propeller shaft 14 and formed with an upward bearing 15 for the end of the engine shaft.

The propeller shaft 8 extends through a casing 16 where it is journaled in a front screw plug 17, which is held by a screw 18 so as to be adjustable toward the front end of the propeller shaft. The rear part of the propeller shaft is journaled in the lid 19, which closes the rear of the casing or chamber 16 and is provided with a stuffing box (not shown) to make a water tight joint about the shaft.

A collar 20 in front of said lid prevents sliding movement of the shaft in the bearing. Each bushing 11 has a collar 21 by which to retain the bevel gears upon the bushings.

Slidably keyed at 22 upon the shaft 14 are two friction clutch members 23, each of which may be moved into a concave friction clutch member 24 of the adjacent bevel gear 10. Engaged in annular grooves 25 of the slidable clutch members are the forked arms 26 of a shifter bar 27, having a transverse slot 28 in which operates an eccentric 29 fixed on an upright shaft 30.

As best shown in Figs. 1 and 3, the shaft 30 has its upper end provided with a lever 31 adapted to be placed alternately in either one of three notches 32 in a segment 33. By said arrangement the operator who steers the boat may at any time, without stopping or reversing the engine, stop the propeller by moving the lever 31 into the middle notch 32, as that sets both clutch members 23 out of action, he may also cause the engine to rotate the propeller in either direction by swinging the lever into either the front or rear notch 32 and thereby cause the eccentric to throw the front or rear clutch member 23 into frictional contact with the clutch member of the respective front or rear gear 10, each of which rotates in a reverse direction of the other.

In Figs. 1, 4 and 5 is shown how the shifter bar 27 may slide upon a support 34 in which is also journaled the bottom end of the shaft 30. The bar 27 may also have a rib 35 sliding in contact with the support 34 so as to thereby hold the forks 26 in proper position in the grooves 25.

36 is the usual eccentric operating a rod 37 of any form of water circulating pump for cooling the engine.

38 designates the rudder, which may be operated by any of the usual means.

What I claim is:—

1. In a motorboat driving gear, a frame adapted to be secured to the rear end of the boat and extend down into the water, an engine in the upper end of the frame and having its shaft extending into the lower end thereof, a driving bevel gear fixed on said lower end, a propeller having a shaft journaled in substantially horizontal position in the lower end of the frame, a sleeve upon the propeller shaft, two bevel gears retained to rotate one upon each end of the sleeve and permanently meshing with the bevel gear on the engine shaft; said two bevel gears having each in its hub a friction clutch member, two friction clutch members slidably keyed on the propeller shaft, a shaft extending upwardly through the frame and having at its lower end an eccentric and at its upper end a lateral handle, a shifter operated by said eccentric and engaging the slidable clutch members to throw them both out of, or either of them into contact with the adjacent clutch member of the bevel gears on the sleeve, and means for holding the handle in either of said three positions.

2. In a motorboat driving gear, a frame adapted to be secured to the rear end of the boat and extend down into the water, an engine in the upper end of the frame and having its shaft extending into the lower end thereof, a driving bevel gear fixed on said lower end, a propeller having a shaft journaled in substantially horizontal position in the lower end of the frame, a sleeve upon the propeller shaft, two bevel gears retained to rotate one upon each end of the sleeve and permanently meshing with the bevel gear on the engine shaft, said two bevel gears having each in its hub a friction clutch member, two friction clutch members slidably keyed on the propeller shaft, a shaft extending upwardly through the frame and having at its lower end an eccentric and at its upper end a lateral handle, a shifter operated by said eccentric and engaging the slidable clutch members to throw them both out of, or either of them into contact with the adjacent clutch member of the bevel gears on the sleeve, and means for holding the handle in either of said three positions, said sleeve having at its middle an upward bearing for the lower end of the engine shaft, whereby the shaft is steadied and the sleeve and its gears held against endwise pressure by the clutches.

3. In a motorboat driving gear, a frame adapted to be secured to the rear end of the boat and extend down into the water, an engine in the upper end of the frame and having its shaft extending into the lower end thereof, a driving bevel gear fixed on said lower end, a propeller having a shaft journaled in substantially horizontal position in the lower end of the frame, a sleeve upon the propeller shaft, two bevel gears retained to rotate one upon each end of the sleeve and permanently meshing with the bevel gear on the engine shaft said two bevel gears having each in its hub a friction clutch member, two friction clutch members slidably keyed on the propeller shaft, a shaft extending upwardly through the frame and having at its lower end an eccentric and at its upper end a lateral handle, a shifter operated by said eccentric and engaging the slidable clutch members to throw them both out of or either of them into contact with the adjacent clutch member of the bevel gears on the sleeve, and means for holding the handle in either of said three positions, said frame having a bearing to support and guide the shifter bar in its movement parallel to the propeller shaft.

4. In a motorboat driving gear, a frame adapted to be secured to the rear end of the boat and extend down into the water, an engine in the upper end of the frame and having its shaft extending into the lower end thereof, a driving bevel gear fixed on said lower end, a propeller having a shaft journaled in substantially horizontal position in the lower end of the frame, a sleeve upon the propeller shaft, two bevel gears retained to rotate one upon each end of the sleeve and permanently meshing with the bevel gear on the engine shaft said two bevel gears having each in its hub a friction clutch member, two friction clutch members slidably keyed on the propeller shaft, a shaft extending upwardly through the frame and having at its lower end an eccentric and at its upper end a lateral handle, a shifter operated by said eccentric and engaging the slidable clutch members to throw them both out of or either of them into contact with the adjacent clutch member of the bevel gears on the sleeve, and means for holding the handle in either of said three positions, said frame having a bearing to support and guide the shifter bar in its movement parallel to the propeller shaft, and said eccentric shaft having its lower end journaled in said bearing.

In testimony whereof I affix my signature.

ANDREW B. MILLER.